(No Model.)  3 Sheets—Sheet 1.

J. S. DAVIS.
HARVESTER REEL.

No. 277,996. Patented May 22, 1883.

WITNESSES
Wm A. Skinkle,
Edwin A. Newman.

INVENTOR
John S. Davis
By his Attorneys
Baldwin, Hopkins & Peyton.

(No Model.) 3 Sheets—Sheet 2.
J. S. DAVIS.
HARVESTER REEL.

No. 277,996. Patented May 22, 1883.

WITNESSES
INVENTOR
John S. Davis.
By his Attorneys, (No Model.)  3 Sheets—Sheet 3.
J. S. DAVIS.
HARVESTER REEL.
No. 277,996.  Patented May 22, 1883.
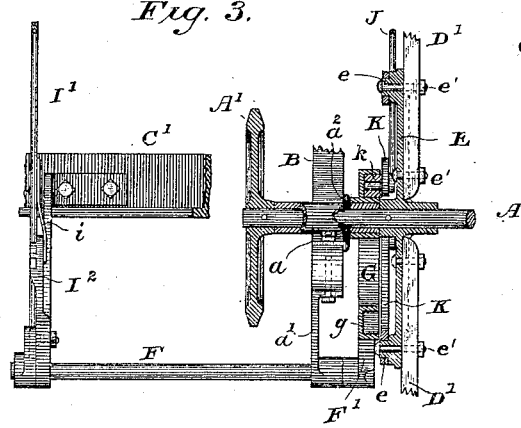
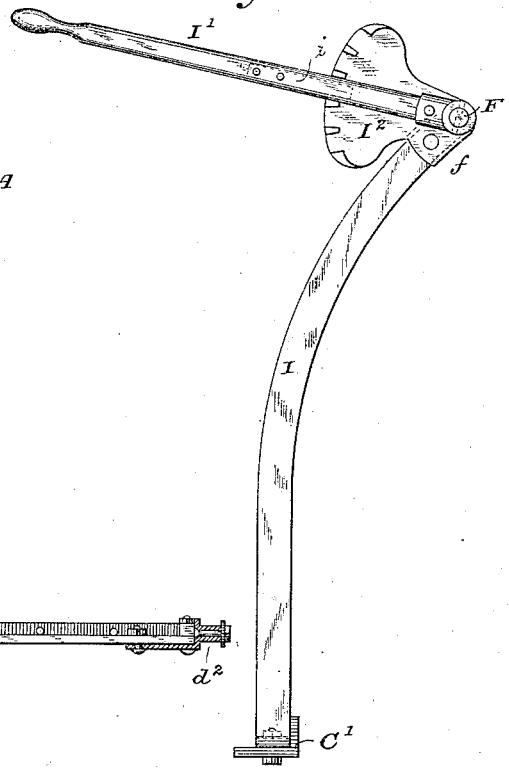
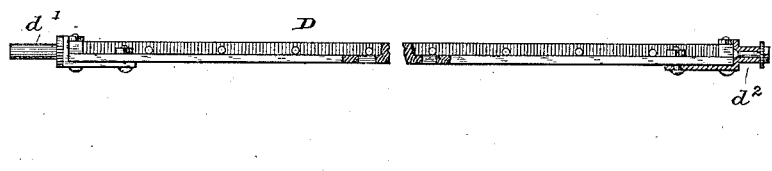
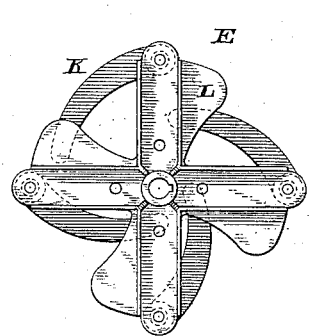
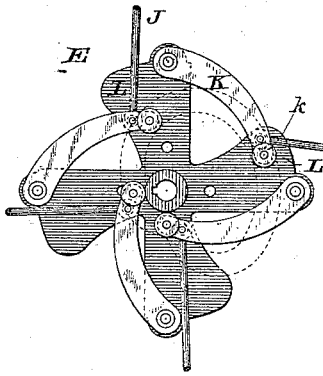
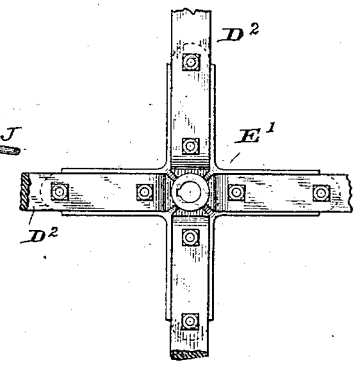
WITNESSES
W<sup>m</sup> A. Skinkle
Edwin A. Newman.
INVENTOR
John S. Davis.
By his Attorneys.
Baldwin, Hopkins & Payton.

UNITED STATES PATENT OFFICE.

JOHN S. DAVIS, OF TOLEDO, OHIO, ASSIGNOR TO THE TOLEDO MOWER AND REAPER COMPANY, OF SAME PLACE.

HARVESTER-REEL.

SPECIFICATION forming part of Letters Patent No. 277,996, dated May 22, 1883.

Application filed November 11, 1882. (No model.)

*To all whom it may concern:*

Be it known that I, JOHN S. DAVIS, of Toledo, in the county of Lucas and State of Ohio, have invented certain new and useful Improvements in Harvester-Reels, of which the following is a specification.

My invention relates to improvements in that class of harvester-reels in which automatically-controlled rocking heads or swinging vanes are employed; and my object mainly is to insure the deposition of the grain well back on the platform as it is cut, and thus prevent the butt-ends of the stalks from coming in contact with the standing or uncut grain and retarding their travel toward the inner end of the platform as the grain is acted upon by an endless carrier or other delivery or raking apparatus. By causing the reel to so deposit the grain upon the platform, endless carrier, &c., as to prevent interference by the standing grain with the movement of the cut grain to or toward the place of gaveling or accumulating, the travel of the heads faster than or in advance of the butts is prevented, and the formation of regular gavels for binding is thus greatly facilitated, as hereinafter to be made apparent.

The subject-matter deemed novel will be designated by the claims, after describing the improvements in connection with such parts of a harvester as are thought to be sufficient to properly illustrate the invention as applied to an overhung reel.

Figure 1:
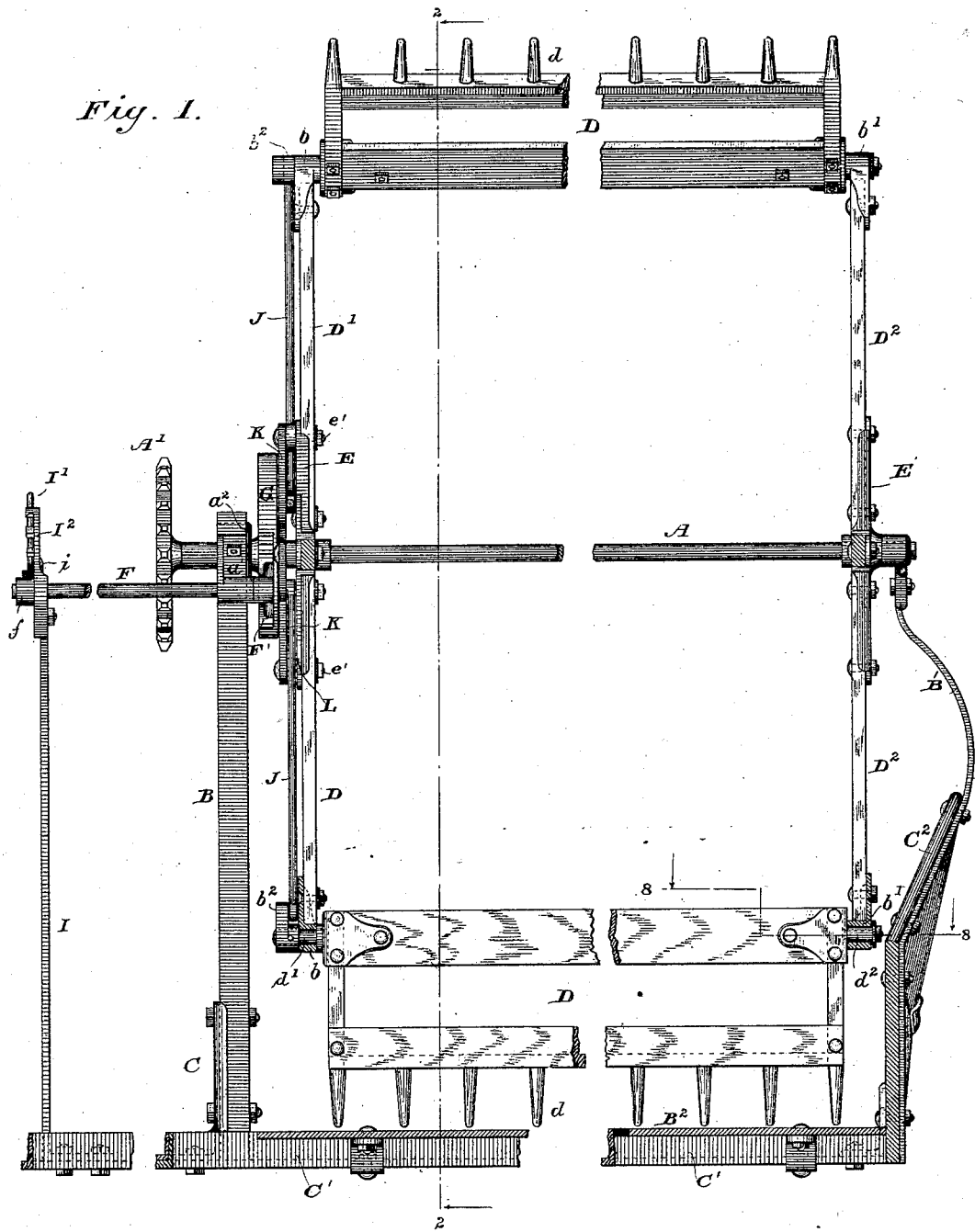
Figure 2:
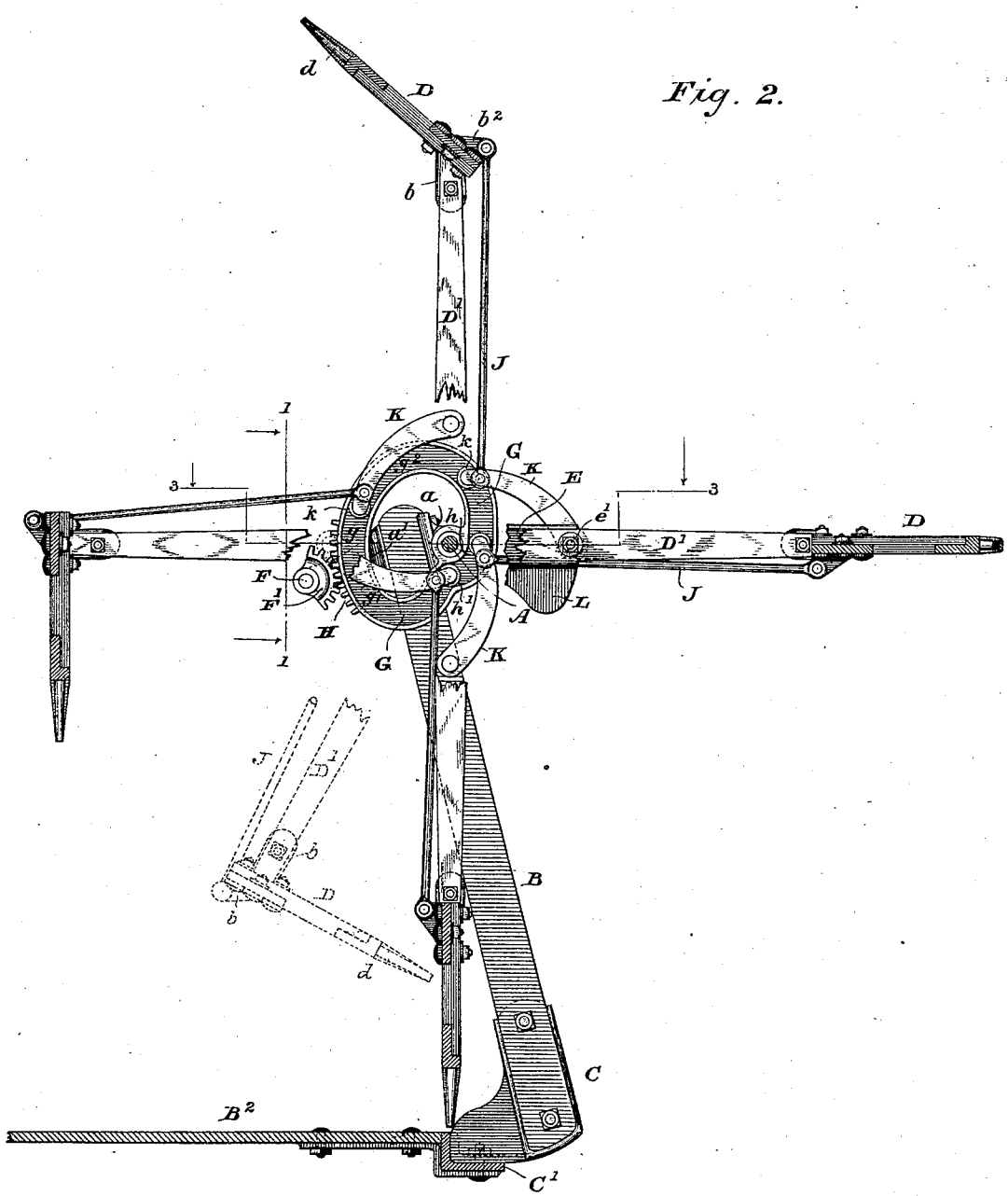

In the accompanying drawings, Figure 1 is a view partly in rear elevation and partly in section on the line 1 1 of Fig. 2, some parts being broken away and others in section. Fig. 2 is a view partly in side elevation and partly in section on the line 2 2 of Fig. 1, one of the reel-vanes being shown by dotted lines as in the position assumed by it after having acted upon the cut grain, and some parts being broken away and others omitted. Fig. 3 is a view partly in plan and partly in section, on the line 3 3 of Fig. 2, with parts broken away or omitted. Fig. 4 is a side elevation, showing the manner of supporting a lever for adjusting mechanism by which the reel-vanes are actuated. Fig. 5 is a detail view, showing an elevation, as seen from the grain side of the machine, of the inner reel-carrying head or spider with the pivoted arms, which are acted upon by a cam to control the action of the reel-vanes; Fig. 6, a view showing an elevation of the opposite side of the reel-carrying head, the cam being shown by dotted lines, and parts of connecting-rods for rocking the reel-vanes being represented. Fig. 7 is a side elevation or face view of the outer reel-carrying head or spider, with the reel-arms secured in place and broken away. Fig. 8 is a top view, partly in section on the line 8 8 of Fig. 1 and partly broken away, of one of the reel-vanes.

A shaft, A, for an overhung reel is suitably supported at or near its opposite ends by a post, B, and a bar, B'. The inner support or post, B, is bolted to a socket-bracket, C, bolted to the finger-beam C', and the outer support or bar, B', is secured to the outer divider, $C^2$, and is curved outwardly to prevent interference with the grain as reeled in to the platform. A sprocket-wheel, A', on the inner end of the reel-shaft, to be operated by a chain driven in suitable way, serves as a means for rotating this shaft. In this instance there are four rocking reel-vanes, D, which are attached to the reel-arms D' and $D^2$, arranged in sets of four each at the inner and outer ends of the shaft, to which they are connected by heads or spiders E E', pinned or otherwise fixedly but detachably secured to the shaft.

Instead of the spiders or skeleton heads E and E', disks may be employed; but in either event flanges to constitute seats or sockets in the respective heads for the arms D' and $D^2$ are provided. The arms are bolted to the spiders.

The vanes are each hung in a pair of reel-arms—one arm of each set—so that they may be rocked to cause the teeth $d$ of the vanes to swing into position parallel, or more or less nearly parallel, with the reel-arms, to act on the grain, and then be rocked up at an angle with the arms to clear the grain on the ordinary endless carrier or platform $B^2$. The vanes are mounted by suitably-attached trunnions $d'$ $d^2$ in clip-bearings $b$ $b'$, secured to the reel-arms, and are controlled and actuated by mechanism, such as soon to be described, connected with cranks $b^2$, secured to the trunnions $d'$.

The inner end of the reel-shaft is journaled in a sleeve-bearing formed by a bracket, $a$, bolted to the reel-post B, and another bracket, $a'$, also bolted to this post, is provided with a bearing for one end of a rock-shaft, F, for a purpose further on to be described. The opposite end of the rock-shaft is mounted in a suitable bearing, $f$, secured to a standard, I, supported on the finger-beam.

A double-walled cam, G, is mounted to rock about the reel-shaft. As shown, the hub of the cam is fitted about the sleeve of the bracket $a$. An annular flange, $a^2$, on the sleeve prevents movement of the cam in one direction lengthwise of the shaft, and the hub of the spider E prevents the cam from moving in the opposite direction. (See Fig. 3.) The cam is not a mere eccentric, but is of peculiar form, as will further on be described. It is adjustable about the reel-shaft.

Mechanism for adjusting the cam by rocking it on the reel-shaft consists, as shown, of a segment gear or rack, H, on the concentric peripheral portion of the cam farthest from the reel-shaft to afford ample leverage, a segment-pinion, F', fastened on the rock-shaft F, and a lever, I', with a suitable detent, I², and a spring, $i$, for holding the lever in its adjusted position. In a fully-organized machine the lever I' extends to within reach of the driver when seated upon the machine. By rocking the shaft F the cam is turned about the bearing of the reel-shaft A to adjust the action of the vanes to the condition of the crop, or so as to cause the vanes to press the grain back upon the platform to the desired extent, as will further on be fully described.

It should be noticed that as the cam is mounted to rock about the sleeve-bearing of the reel-shaft, instead of directly about the reel-shaft, the driver of the machine may adjust the cam during the operation of the machine without obstruction by the revolution of the reel-shaft.

The mechanism for controlling and actuating the vanes D from the cam G will now be described.

The crank $b^2$ of each of the rocking vanes D is connected by a rod or link, J, with a cam-actuated vibrating controlling-arm, K. The connecting-rods J are pivotally secured at their opposite ends to the cranks $b^2$ and the controlling-arms. Each of the connecting-rods is pivoted to its arm K near one end thereof, and an anti-friction roller, $k$, at the same end of the arm travels the cam-track $g$. The opposite end of the arm is pivotally connected with the reel-arm preceding that with the vane of which the roller end of the arm is connected—that is to say, the connecting-rods J of the series are respectively jointed to the roller ends of cam-controlled arms, which at their opposite ends, respectively, have pivotal connection with the preceding reel-arms at the inner end of the reel-shaft.

The pivotal connection between each vibrating arm K and the reel-arm D' preceding that the vane of which is to be controlled by connections with said arm K is shown as formed by a boss, $e$, on the spider E and one of the pair of bolts, $e'$ $e'$, by which the reel-arm is secured to its arm of the spider.

The spider-arms are made broader at and near their outer ends than is necessary merely to provide seats for the reel-arms, by being formed with the flanges L, so as to prevent the accidental escape of the cam-roller $k$ from the cam-track $g$. It will be seen that by this construction the upper ends of the rods will always be confined without cramping between some portion of the spider on the one side and the cam G on the other.

From the above description, aided by the drawings, it will be seen that at each revolution of a vane about the reel-shaft it is twice rocked, being turned for about a quarter of a revolution at each rock, one turn gradually bringing the vane into position such that its teeth extend parallel with the reel-arms to which it is pivoted and reach to their greatest distance from the reel-shaft, and the other or reverse turn suddenly throwing up the teeth, thus quickly freeing them from the grain when it is swept back far enough, and causing the vane to project at or about at a right angle with the reel-arms. Two portions of the cam-track are concentric with its axis, one portion being quite short and extending from $h$ to $h'$, and the other and longer portion extending from $g'$ to $g^2$. As during the times the roller of a controlling-arm is traveling these concentric portions of the track there is no change relatively to its reel-arms of a vane controlled by said arm, it is obvious that by adjusting the cam about the reel-shaft, as before explained, the vanes may be caused to quickly swing up sooner or later by the action upon the rollers of the controlling-arms of the abruptly-curved eccentric portion of the track between $h'$ and $g'$, and the grain be deposited with its butts nearer to or farther from the finger-beams, as desired. The action upon the rollers of the controlling-arms of the eccentric portion of the track between $g^2$ and $h$ restores the vanes to the position occupied by them when acting on the standing and cut grain. It should be noticed that the vanes are positively controlled by the cam at all times, and that the cam is so shaped as to perform the important function of quickly rocking the reel-teeth away from the butts of the grain when the stalks have been properly adjusted upon the carrier or platform, the points of the teeth being caused to swing toward the cutting apparatus or standing grain, thus preventing possibility of entanglement of the teeth with the deposited cut grain and providing for accurately adjusting it so as to leave it with its butts in that position relatively to the cutting apparatus which is deemed most desirable.

I am aware that it is not new, broadly considered, to control rocking reel-vanes by a cam mounted on the reel-shaft and connected with said vanes, and therefore I do not unqualifiedly claim such construction or combination of parts.

I am also aware that rocking reel-vanes have been controlled by an eccentric or circular disk mounted off the center on the reel-shaft and connected with the vanes. I make no claim to mechanism involving a mere eccentric, a non-circular or irregularly-curved cam being a necessary element of my improvements.

I claim as of my own invention—

1. The combination of the reel-arms, the rocking reel-vanes, the cranks of the reel-vanes, the connecting-rods pivoted to said cranks, the controlling-arms pivoted to the reel-arms and having pivotal connection with the connecting-rods, which are pivoted to the cranks of the respectively following reel-vanes, and the cam by which the controlling-arms are actuated, substantially as and for the purpose hereinbefore set forth.

2. The combination of the reel-shaft, the reel-arms, the cam, the controlling-arms pivoted to the reel-arms, the rollers on the controlling-arms, the connecting-rods, and the reel-vanes having connection with the controlling-arms pivoted to the respectively preceding reel-arms, substantially as and for the purpose hereinbefore set forth.

3. The combination of the reel-shaft, the cam, the head or spider E, the reel-arms, the rocking reel-vanes, and the controlling-arms having connection with the reel-vanes, and provided with rollers confined against displacement between the cam and spider, substantially as hereinbefore set forth.

4. The combination of the reel-shaft, the cam, the spider having its arms formed with flanges L, the reel-arms, the controlling-arms pivoted thereto, the rollers of the controlling-arms, and the connecting-rods pivoted to the controlling-arms, substantially as and for the purpose hereinbefore set forth.

5. The combination of the reel-post, the reel-shaft, the bearing-bracket, in the sleeve of which the reel-shaft is mounted, the rocking cam adjustable about said sleeve, the spider or reel-head E, the reel-arms, the rocking reel-vanes, and their cam-actuated controlling mechanism, substantially as and for the purpose hereinbefore set forth.

6. The combination of the reel-shaft, the reel-post, the bracket provided with the annularly-flanged bearing-sleeve, the rocking-cam, and the reel-head or spider at the side thereof, substantially as and for the purpose hereinbefore set forth.

In testimony whereof I have hereunto subscribed my name.

JOHN S. DAVIS.

Witnesses:
GEORGE W. HUMPHREY,
WILLIE HUMPHREY.